Figure 1:
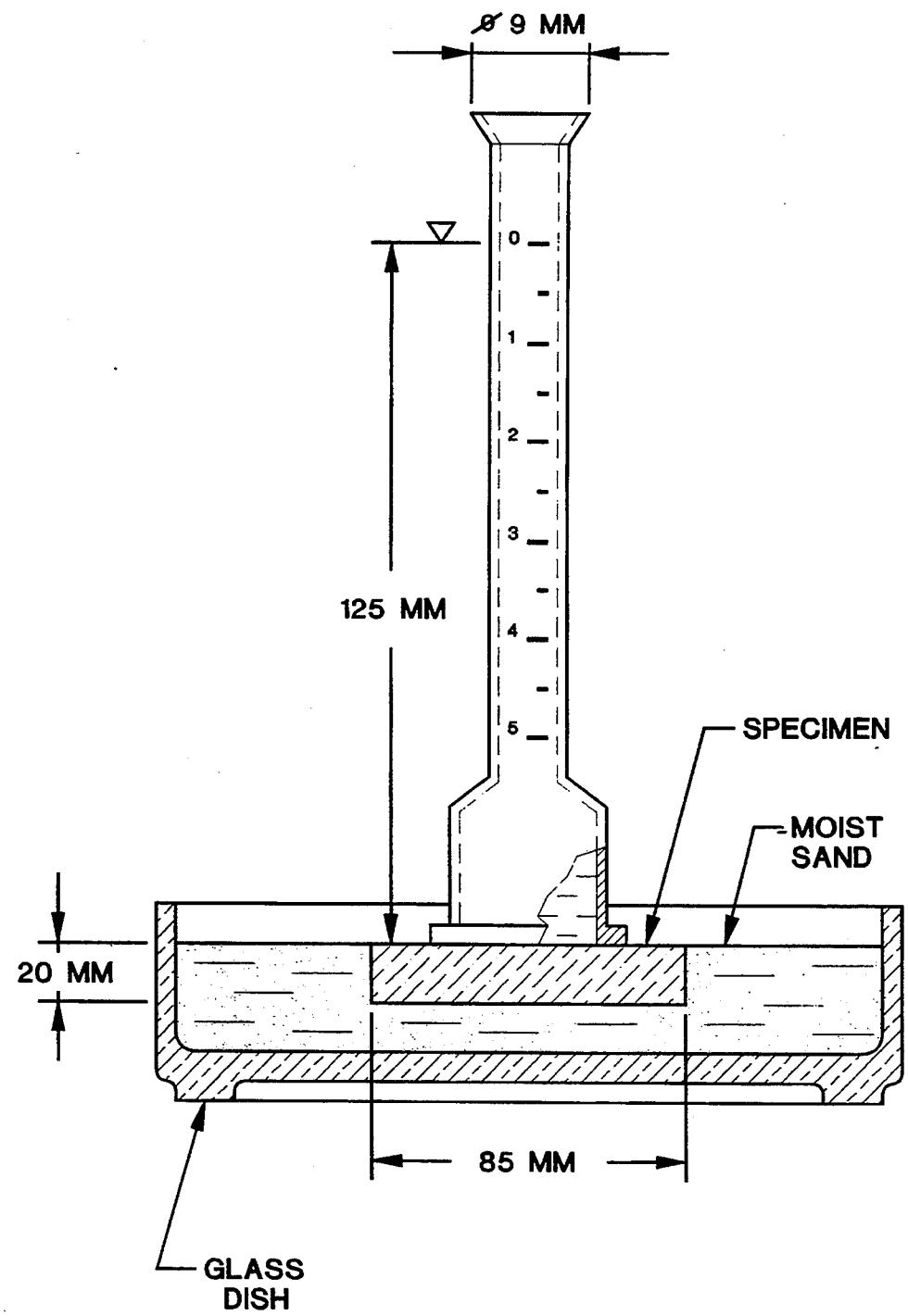

United States Patent [19]

Gerhardinger et al.

[11] Patent Number: 5,409,984
[45] Date of Patent: Apr. 25, 1995

[54] POLLUTANT-RESISTANT COMPOSITION CONTAINING ORGANOPOLYSILOXANES

[75] Inventors: Dieter Gerhardinger, Burghausen; Karl-Heinz Felix, Reut; Johann Mittermeier, Altötting, all of Germany

[73] Assignee: Wacker-Chemie GmbH, Munich, Germany

[21] Appl. No.: 164,099

[22] Filed: Dec. 9, 1993

[30] Foreign Application Priority Data

Dec. 10, 1992 [DE] Germany ............ 42 41 714.7

[51] Int. Cl.⁶ ............................ C08K 5/05
[52] U.S. Cl. ............................ 524/445; 524/442; 524/444
[58] Field of Search ............................ 524/445

[56] References Cited

U.S. PATENT DOCUMENTS

| | | |
|---|---|---|
| 3,190,762 | 6/1965 | Carlson et al. ............ 106/90 |
| 3,355,424 | 11/1967 | Brown . |
| 3,890,269 | 6/1975 | Martin . |
| 4,247,330 | 1/1981 | Sanders, Jr. . |
| 4,565,577 | 1/1986 | Burkhardt et al. . |
| 4,645,382 | 2/1987 | Burkhardt et al. . |
| 4,661,551 | 4/1987 | Mayer et al. . |
| 4,757,106 | 7/1988 | Mayer et al. ............ 524/262 |

FOREIGN PATENT DOCUMENTS

| | | |
|---|---|---|
| 0068671 | 1/1983 | European Pat. Off. . |
| 0139838 | 5/1985 | European Pat. Off. . |
| 0242798 | 10/1987 | European Pat. Off. . |
| 0121808 | 6/1989 | European Pat. Off. . |
| 1201225 | 9/1965 | Germany . |
| 2162223 | 1/1986 | United Kingdom . |
| 8301204 | 4/1983 | WIPO . |

*Primary Examiner*—Melvyn I. Marquis
*Assistant Examiner*—Helen F. Lee
*Attorney, Agent, or Firm*—Martin Connaughton

[57] ABSTRACT

The invention relates to pollutant-resistant compositions containing organopolysiloxanes. They are used for producing impermeable walls and similar ground seals introduced into the earth. This pollutant-resistant organopolysiloxane-containing composition comprises (A) a salt of organic or inorganic acid and organopolysiloxane which has SiC-attached radicals containing basic nitrogen in amounts of at least 0.5% by weight of basic nitrogen, based on the weight of this organopolysiloxane, (B) organosilicon compound containing basic nitrogen in amounts of from 0 to 0.5% by weight, based on the weight of this organosilicon compound, (C) swellable clay minerals and (D) hydraulic binder.

4 Claims, 1 Drawing Sheet

POLLUTANT-RESISTANT COMPOSITION CONTAINING ORGANOPOLYSILOXANES

FIELD OF INVENTION

The invention relates to pollutant-resistant compositions containing organopolysiloxanes. They are used for producing impermeable walls and similar ground seals introduced into the earth.

BACKGROUND OF INVENTION

A process for isolating pollutants in ground layers is known from EP-B-121 808, in which a gel-forming mixture based on alkali metal silicate and containing at least one alkyltrialkoxysilane is injected into the ground.

EP-A-139 838 discloses pollutant-resistant compositions which, in addition to swellable clay minerals, hydraulic binders, fillers and water, contain an additional amount of alkali metal aluminates and of trialkoxysilanes of the formula $R-Si(OR')_3$, or their hydrolysis products, where R is an aliphatic radical having from 2 to 6 carbon atoms and R' are alkyl radicals which may be identical or different and which have from 1 to 4 carbon atoms.

SUMMARY OF THE INVENTION

The invention provides a pollutant-resistant organopolysiloxane-containing composition for producing impermeable walls, landfill linings and similar seals, particularly those set into the earth, said composition comprising (A) a salt of organic or inorganic acid and organopolysiloxane which has SiC-attached radicals containing basic nitrogen in amounts of at least 0.5% by weight of basic nitrogen, based on the weight of the organopolysiloxane, (B) an organosilicon compound containing basic nitrogen in amounts of from 0 to 0.5% by weight, based on the weight of the organosilicon compound, (C) swellable clay minerals and (D) hydraulic binder.

In the context of this invention, the quantities of "basic nitrogen" given are to be taken as nitrogen calculated as the element.

The organopolysiloxanes from which component (A) of the composition of the invention can be obtained by reaction with an organic or inorganic acid are preferably those of the formula $$R_a R_b^1 (OR^2)_c SiO_{\frac{4-a-b-c}{2}} \quad (I)$$

in which

R may be identical or different and is hydrogen or univalent, basic nitrogen-free, SiC-attached organic radicals, $R^1$ may be identical or different and is univalent SiC-attached radicals containing basic nitrogen, $R^2$ may be identical or different and is a hydrogen atom or univalent organic radicals, a is 0, 1, 2 or 3, b is 0, 1, 2 or 3 and c is 0, 1, 2 or 3, with the proviso that c is an average of at least 0.1 and the sum of a, b and c is equal to or less than 3 and the radical $R^1$ is percent in amounts of more than 0.5% by weight of basic nitrogen per organopolysiloxane molecule.

The radical R is preferably a substituted or unsubstituted hydrocarbon radical having from 1 to 20 carbon atoms. Preferably each silicon atom to which a hydrogen atom is attached also has a hydrocarbon radical, in particular a methyl radical, attached to it.

Examples of radicals R are alkyl radicals, such as the methyl, ethyl, n-propyl, iso-propyl, n-butyl, iso-butyl, tert-butyl, n-pentyl, iso-pentyl, neo-pentyl, tert-pentyl radical, hexyl radicals, such as the n-hexyl radical, heptyl radicals, such as the n-heptyl radical, octyl radicals, such as the n-octyl radical and iso-octyl radicals, such as the 2,2,4-trimethylpentyl radical, nonyl radicals, such as the n-nonyl radical, decyl radicals, such as the n-decyl radical, dodecyl radicals, such as the n-dodecyl radical, octadecyl radicals, such as the n-octadecyl radical; alkenyl radicals, such as the vinyl, allyl, n-5-hexenyl, 4-vinylcyclohexyl and the 3-norbornenyl radical; cycloalkyl radicals, such as cyclopentyl, cyclohexyl, 4-ethylcyclohexyl, cycloheptyl radicals, norbornyl radicals and methylcyclohexyl radicals; aryl radicals, such as the phenyl, biphenylyl, naphthyl and anthryl and phenanthryl radical; alkaryl radicals, such as o-, m-, p-tolyl radical, xylyl radicals and ethylphenyl radicals; aralkyl radicals, such as the benzyl radical, the $\alpha$ and $\beta$-phenylethyl radical.

Examples of substituted hydrocarbon radicals as radical R are halogenated hydrocarbon radicals, such as the chloromethyl, 3-chloropropyl, 3-bromopropyl, 3,3,3-trifluoropropyl and 5,5,5,4,4,3,3-heptafluoropentyl radical, and also the chlorophenyl, dichlorophenyl and trifluorotolyl radical; mercaptoalkyl radicals, such as the 2-mercaptoethyl and 3-mercaptopropyl radical; cyano-alkyl radicals, such as the 2-cyanoethyl and 3-cyanopropyl radical; acyloxyalkyl radicals, such as the 3-arcyloxypropyl and 3-methacryloxypropyl radical; hydroxyalkyl radicals, such as the hydroxypropyl radical and radicals of the formula

and $HOCH_2CH(OH)CH_2SCH_2CH_2-$.

The radical $R^1$ is preferably one of the formula $$R^3_2 NR^4- \quad (II)$$

in which $R^3$ may be identical or different and is hydrogen or a univalent, substituted or unsubstituted hydrocarbon radical and $R^4$ is a bivalent hydrocarbon radical.

Examples of the radical $R^3$ are the examples of hydrocarbon radicals given for the radical R and also hydrocarbon radicals substituted by amino groups, such as aminoalkyl radicals.

Preferably there is at least one hydrogen atom attached to each nitrogen atom in the radicals of formula (II).

Preferably the radical $R^4$ is a bivalent hydrocarbon radical having from 1 to 10 carbon atoms, particularly preferably from 1 to 4 carbon atoms, most particularly the n-propylene radical.

Examples of the radical $R^4$ are the methylene, ethylene, propylene, butylene, cyclohexylene, octadecylene, phenylene and butenylene radical.

Examples of the radical $R^1$ are $H_2N(CH_2)_3-$, $H_2N(CH_2)_2NH(CH_2)_2-$, $H_2N(CH_2)_2NH(CH_2)_3-$, $H_2N(CH_2)_2-$, $H_3CNH(CH_2)_3-$, $C_2H_5NH(CH_2)_3-$, $H_3CNH(CH_2)_2-$, $C_2H_5NH(CH_2)_2-$, $H_2N(CH_2)_4-$, $H_2N(CH_2)_5-$, $H(NHCH_2CH_2)_3-$, $C_4H_9NH(CH_2)_2NH(CH_2)_2-$, cyclo-$C_6H_{11}NH(CH_2)_3-$, cyclo-$C_6H_{11}NH(CH_2)_2-$, $(CH_3)_2N(CH_2)_3-$, $(CH_3)_2N(CH_2)_2-$, $(C_2H_5)_2N(CH_2)_3-$ and $(C_2H_5)_2N(CH_2)_2-$.

All the examples of alkyl radicals R are also applicable to the radical $R^2$.

The organopolysiloxanes comprising units of the formula (I) preferably have a viscosity of from 15 to 2500 mPas, particularly preferably from 20 to 800 mPas.

The organopolysiloxanes comprising units of formula (I) can be prepared by known methods, for example by equlibrating or condensing amino-functional silanes with organopolysiloxanes which are free of basic nitrogen.

The organic or inorganic acids which are used for preparing component (A) of the composition of the invention can be the same as have previously been usable for preparing salts of an organic or inorganic acid and an organopolysiloxane having SiC-attached radicals containing basic nitrogen. Examples for such acids are HCl, $H_2SO_4$, acetic acid, propionic acid, diethyl hydrogen phosphate, where propionic acid and acetic acid are preferred and acetic acid is particularly preferred.

Compounds which can be used as component (A) in the composition of the invention are already known; see, for example, EP 68 671 A2 and U.S. Pat. No. 4,661,551 (Wacker-Chemie GmbH, issued Apr. 28, 1987) and also U.S. Pat. No. 3,890,269 (Stauffer Chemical Co., issued Jun. 17, 1975), U.S. Pat. No. 3,355,424 (Dow Corning Corp., issued Nov. 28, 1967 and U.S. Pat. No. 4,247,330 (SWS Silicones Corp., issued Jan. 27, 1981).

The organopolysiloxane salt used as component (A) may be a single organopolysiloxane salt or a mixture of two or more salts.

The composition of the invention preferably contains from 0.01 to 5% by weight, particularly preferably from 0.1 to 0.5% by weight, of component (A), in each case based on the total weight of the composition of the invention.

The organosilicon compound (B) may, for example, be tetraalkoxysilanes, such as tetraethyl silicate, organoalkoxysilanes or organoalkoxyalkylenoxysilanes, such as dimethyldimethoxysilane, methyltrimethoxysilane, phenyltrimethoxysilane, vinyltrimethoxysilane, n-octyltrimethoxysilane, isooctyltrimethoxysilane, 2-ethylhexyltrimethoxysilane, methyl-tris-(methoxyethyleneoxy) silane, dimethyldiethoxysilane and n-octadecyltrimethoxysilane, siloxanes having from 2 to 10 siloxane units per molecule, such as hexamethyldisiloxane, 1,1,3,3-tetramethoxy-1,3-dimethyldisiloxane and 1,1,3,3-tetramethyl-1,3-divinyldisiloxane, all the above mentioned examples of basic nitrogen-free polysiloxanes, and siloxanes of the formula

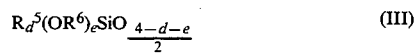

$$R_d^5(OR^6)_e SiO_{\frac{4-d-e}{2}} \quad (III)$$

in which $R^5$ may be identical or different and is hydrogen or univalent, SiC-attached organic radicals, $R^6$ may be identical or different and is a hydrogen atom or monovalent organic radicals, d is 0, 1, 2, 3 or 4 and e is 0, 1, 2, 3 or 4, with the proviso that the sum of d and e is equal to or less than 4 and the content of basic nitrogen is from 0 to 0.5% by weight, based on the weight of the respective organosilicon compound.

Examples of radical $R^5$ are the examples given for radical R and also hydrocarbon radicals substituted by amino groups.

Examples of radical $R^6$ are the examples given for $R^2$.

The organosilicon compound comprising units of formula (III) may be a silane, i.e., the sum of d and e equals 4.

The organosilicon compounds comprising units of formula (III) may also be organopolysiloxanes, i.e., the sum of d and e is less or equal to 3.

Preferred examples of silanes of the formula (III) are i-octyltrimethoxysilane and i-octyltriethoxysilane.

The organosilicon compound (B) is preferably used in amounts of from 0.01 to 10% by weight, particularly preferably from 0.2 to 1.0% by weight, in each case based on the total weight of the composition of the invention.

The organosilicon compound (B) may be a single type or a mixture of two or more such organosilicon compounds.

Particularly preferred organosilicon compounds (B) are silanes and low molecular weight siloxanes, in particular silanes.

The swellable clay mineral (C) is, in particular, a silicate having a layer-lattice structure, in which the layers can be separated from one another by penetration of water. Examples of these minerals are kaolinite, attapulgite, the bentonites Bentone SD-1, hectorite and montmorillonites.

The composition of the invention preferably contains from 0.1 to 15% by weight of the component (C), particularly preferably from 1 to 5% by weight, in each case based on the total weight of the composition of the invention.

The hydraulic binder (D) which is present according to the invention may be an inorganic binder which sets by hydration, such as hydraulic mortars or cements according to DIN 1164, for example, blast furnace cement or portland cement.

The composition of the invention contains hydraulic binders (D) preferably in amounts of from 5 to 30% by weight, particularly preferably from 10 to 20% by weight, in each case based on the total weight of the composition of the invention.

In a preferred embodiment, the compositions of the invention, in addition to the stated components A to D, also contain concrete additives (E) and/or fillers (F).

The composition of the invention may contain, as an additional component (E), concrete additives such as, for example, Melmet F10 in amounts up to 5% by weight, preferably from 0.1 to 2% by weight, based on the total weight of the composition of the invention.

The composition of the invention may contain, as an additional component (F), fillers such as calcium carbonate (calcite), sand and/or ground minerals, for example, limestone, dolomite, or quartz in amounts of up to 90% by weight, preferably from 45 to 85% by weight, in each case based on the total weight of the composition of the invention.

The composition of the invention preferably contains from 0.01 to 5% by weight of component (A), from 0.01 to 10% by weight of component (B), from 0.1 to 15% by weight of component (C), from 5 to 30% by weight of component (D), from 0.1 to 2% by weight of component (E), and from 45 to 85% by weight of component (F), in each case based on the total weight of the composition of the invention.

The composition of the invention may be produced by mixing an organopolysiloxane comprising units of the formula (I) with an organic or inorganic acid to form component (A) and with the additional components (B) to, if required, (F). Preferably this mixing is carried out at a temperature of 20° C. and a pressure of from 900 to 1100 hPa.

The composition of the invention may be diluted with water in desired ratios to give stable mixtures. Preferably the composition of the invention is diluted with water in amounts of from 10 to 50% by weight, particularly preferably from 15 to 30% by weight, in each case based on the total weight of the composition of the invention.

The composition of the invention is preferably produced by first preparing an organopolysiloxane-containing composition from A and B, as described, for example, in EP B 186 847, and then mixing this with the additional components and water. In addition to the stated components, the composition of the invention may contain additional respectively desired components which are known for building materials.

The composition of the invention is produced by using the usual mixing equipment for producing impermeable-wall compositions. The organopolysiloxane-containing composition first prepared from A and B is added to the other components during the mixing process, but it can also be premixed with a part of the solids. The water content is adjusted so that a viscous workable composition is obtained. This composition can be used for producing impermeable walls and similar ground seals introduced into the earth. It shows a reduced permeability to pollutants such as, hydrocarbons, halogenated hydrocarbons, solvent mixtures, phenols, gasoline, diesel fuel or diluted acids and alkalies.

The composition of the invention is thus particularly suitable for producing enclosing walls for the enclosure, described as microencapsulation, or an area contaminated with pollutant. The migration of the pollutants out of the enclosed area and their entering the ground water is thus prevented more completely and for a longer period of time than with impermeable-wall materials known from the prior art.

FIG. 1 shows the experimental arrangement used in the examples for determining the pollutant resistance.

In the examples below, all parts and percentages given are by weight, unless otherwise indicated. Unless otherwise indicated, the examples below are carried out at the pressure of the surrounding atmosphere, i.e., at about 1000 hPa, and at room temperature, i.e., at about 20° C., or at a temperature which is reached while mixing the reactants together at room temperature without additional heating or cooling. All the viscosity data given in the examples are for a temperature of 25° C.

EXAMPLE 1 (B1)

Production of organopolysiloxane-containing sealing compositions

A 1 liter three-necked flask fitted with stirrer, dropping funnel and reflux condenser was charged with a mixture of 0.2 g of KOH in 4 g of methanol and 500 g of a α,w-dihydroxymethylpolysiloxane having an Si-attached hydroxyl group in each of the terminal units and an average molecular weight of about 4000 g/mole, and 150 g of N-(2-aminoethyl)-3-aminopropyltrimethoxysilane added while stirring. The mixture so obtained was heated to boiling under reflux for 6 hours, and was then cooled to 30° C. and mixed with 2.5 ml of 10% strength hydrochloric acid. The methanol was distilled off by heating to 140° C. and the organopolysiloxane so obtained was separated from KCl by filtration. The organopolysiloxane so obtained contained 2.9% of basic nitrogen.

40 g of this organopolysiloxane containing basic nitrogen were mixed with 5 g of glacial acetic acid, 80 g of the organopolysiloxane of empirical formula $CH_3Si(OC_2H_5)_{0.8}O_{1.1}$ and of an average molecular weight of 600 g/mole and 10 g of iso-octyltrimethoxysilane, forming a clear mixture.

a. 9 g of this clear mixture were mixed with 420 g of water, 12 g of Melment F10 (obtainable from SKW Trostberg AG, Trostberg), 24 g of hectorite, 900 g of quartz sand 0.1–0.4 (obtainable from Amberger Kaolinwerke GmbH), 600 g of calcite, 300 g of blast furnace cement HOZ 35L (obtainable from Südbayer. Portlandzementwerk). Mixing was carried out in a dissolver (Pendraulic, model LD 50), the mixing time being 5 min at a disk rotation rate of 1865 rpm.

b. 9 g of the clear mixture from Example 1a were mixed, as described in Example 1a, with 420 g of water, 12 g of Melment F10, 24 g of Bentone SD1 (obtainable from Kronos Titan GmbH), 900 g of quartz sand 0.1–0.4, 600 g of calcite and 300 g of blast furnace cement HOZ 35L.

c. 9 g of the clear mixture from Example 1a were mixed, as described in Example 1a, with 420 g of water, 12 g of Melment F10, 12 g of Bentone SD1, 12 g of hectorite, 900 g of quartz sand 0.1–0.4, 600 g of calcite and 300 g of blast furnace cement HOZ 35L.

COMPARATIVE EXAMPLE 1 (V1)

Production of known sealing compositions a. as described in Example 1a, 420 g of water, 12 g of Melment F10 (obtainable from SKW Trostberg AG, Trostberg), 24 g of hectorite, 900 g of quartz sand 0.1–0.4 (obtainable from Amberger Kaolinwerke GmbH), 600 g of calcite, 300 g of blast furnace cement HOZ 35L (obtainable from Südbayer. Portlandzementwerk) were mixed.

b. as described in Example 1b, 420 g of water, 12 g of Melment F10, 24 g of Bentone SD1 (obtainable from Kronos Titan GmbH), 900 g of quartz sand 0.1–0.4, 600 g of calcite and 300 g of blast furnace cement HOZ 35L were mixed.

c. as described in Example 1c, 420 g of water, 12 g of Melment F10, 12 g of Bentone SD1, 12 g of hectorite, 900 g of quartz sand 0.1–0.4, 600 g of calcite and 300 g of blast furnace cement HOZ 35L were mixed.

d. as described in Example 1a, 420 g of water, 12 g of Melment F10, (obtainable from SKW Trostberg AG, Trostberg), 24 g of hectorite, 900 g of quartz sand 0.1–0.4 (obtainable from Amberger Kaolinwerke GmbH), 600 g of calcite, 300 g of blast furnace cement HOZ 35L (obtainable from Südbayer. Portlandzementwerk) were mixed with 9 g of propyltrimethoxysilane.

e. as described in Example 1b, 420 g of water, 12 g of Melment F10, 24 g of Bentone SD1 (obtainable from Kronos Titan GmbH), 900 g of quartz sand 0.1–0.4, 600 g of calcite and 300 g of blast furnace cement HOZ 35L were mixed with 9 g of propyltrimethoxysilane.

f. as described in Example 1c, 420 g of water, 12 g of Melment F10, 12 g of Bentone SD1, 12 g of hectorite, 900 g of quartz sand 0.1–0.4, 600 g of calcite and 300 g of blast furnace cement HOZ 35L were mixed with 9 g of propyltrimethoxysilane.

g. as described in Example 1a, 420 g of water, 12 g of Melment F10 (obtainable from SKW Trostberg AG, Trostberg), 24 g of hectorite, 900 g of quartz sand 0.1–0.4 (obtainable from Amberger Kaolinwerke GmbH), 600 g of calcite, 300 g of blast furnace cement HOZ 35L (obtainable from Südbayer. Portlandzementwerk) were mixed with 9 g of a 50% strength aqueous siloxane/silane emulsion, commercially available under the designation BS 51 from Wacker-Chemie GmbH in Munich.

h. as described in Example 1a, 420 g of water, 12 g of Melment F10 (obtainable from SKW Trostberg AG, Trostberg), 24 g of hectorite, 900 g of quartz sand 0.1–0.4 (obtainable from Amberger Kaolinwerke GmbH), 600 g of calcite, 300 g of blast furnace cement HOZ 35L (obtainable from Südbayer. Portlandzementwerk) were mixed with 9 g of a 50% strength aqueous methyl resin emulsion, commercially available under the designation BS 96 from Wacker-Chemie GmbH in Munich.

i. as described in Example 1a, 420 g of water, 12 g of Melment F10 (obtainable from SKW Trostberg AG, Trostberg), 24 g of hectorite, 900 g of quartz sand 0.1–0.4 (obtainable from Amberger Kaolinwerke GmbH), 600 g of calcite, 300 g of blast furnace cement HOZ 35L (obtainable from Südbayer. Portlandzementwerk) were mixed with 9 g of a 45% strength aqueous solution of propyl siliconate, commercially available under the designation BS 20 from Wacker-Chemie GmbH in Munich.

j. as described in Example 1, 420 g of water, 12 g of Melment F10 (obtainable from SKW Trostberg AG, Trostberg), 24 g of hectorite, 900 g of quartz sand 0.1–0.4 (obtainable from Amberger Kaolinwerke GmbH), 600 g of calcite, 300 g of blast furnace cement HOZ 35L (obtainable from Südbayer. Portlandzementwerk) were mixed with 18 g of a 45% strength aqueous solution of propyl siliconate, commercially available under the designation BS 20 from Wacker-Chemie GmbH in Munich.

EXAMPLE 2

Testing the sealing compositions for pollutant resistance

The sealing compositions produced in Example 1 and Comparative Example 1 were cast in round test molds. They were demolded after 96 hrs conditioning at 23° C. and 50% relative humidity.

The pollutant resistance was determined with an arrangement as shown in FIG. 1. A Karsten tube was fixed with adhesive to the top of the test specimen and the test specimen was embedded horizontally in moist sand. The Karsten tube was filled to a height of 125 mm (graduation mark 0). The drop in the liquid level was recorded at intervals of 240 min. The liquid level was in each case refilled to graduation mark 0. The amount of liquid which had flowed through in each case after 7 days is shown in Table 2. The experiment was carried out with the liquids shown in Table 1. The amount of liquid which had flowed through in each case is proportional to the permeability of the respective test specimen for this liquid.

TABLE 1

| Liquids used | |
|---|---|
| Water | Drinking water quality |
| TCE/water | 0.1% trichloroethylene in drinking water |
| Phenol water | 5% by weight phenol |
| | 95% by weight drinking water |
| Solvent mixture | 20% by weight toluene |
| | 20% by weight xylene |
| | 20% by weight ethanol |
| | 20% by weight isopropanol |
| | 20% by weight acetone |
| Diesel | motor-car diesel fuel grade |
| Acid | 0.49% strength sulfuric acid (0.1 N) |
| Alkali | 0.56% strength potassium hydroxide solution (0.1 N) |

TABLE 2

| | Water | Solvent mixture | Phenol water | Diesel | Water/TCE | Acid | Alkali |
|---|---|---|---|---|---|---|---|
| Example | | | | | | | |
| 1 a | 1.2 | 20.7 | 1.7 | 8.5 | 1.5 | 1.2 | 1.0 |
| 1 b | 1.3 | 8.6 | 2.1 | 2.2 | — | 0.95 | 1.0 |
| 1 c | 1.8 | 77.8 | 1.8 | 41.8 | — | 1.4 | 1.1 |
| Comparson Ex. | | | | | | | |
| 1 a | 47.3 | 126.8 | 56.0 | 28.5 | 48.0 | 10.4 | 86.2 |
| 1 b | 29.1 | 99.8 | 64.3 | 27.9 | — | 69.9 | 102.4 |
| 1 c | 16.0 | 104.5 | 23.2 | 31.8 | — | 4.5 | 12.0 |
| 1 d | 3.0 | 175.0 | 1.8 | 31.9 | 2.2 | 1.35 | 2.1 |
| 1 e | 2.1 | 175.0 | 2.1 | 46.6 | — | 1.65 | 16.8 |
| 1 f | 1.9 | 175.0 | 12.6 | 32.3 | — | 1.25 | 1.7 |
| 1 g | 17.3 | — | — | — | 11.2 | — | — |
| 1 h | 16.8 | — | — | — | 15.5 | — | — |
| 1 i | 6.6 | — | — | — | 8.7 | — | — |
| 1 j | 12.0 | — | — | — | 10.4 | — | — |

What is claimed is:

1. A pollutant-resistant organopolysiloxane-containing composition for producing impermeable walls, landfill linings and similar seals, particularly those set into the earth, comprising;
   (A) a salt of organic or inorganic acid and organopolysiloxane which has SiC-attached radicals containing basic nitrogen in amounts of at least 0.5% by weight of basic nitrogen, based on the weight of the organopolysiloxane,
   (B) an organosilicon compound containing basic nitrogen in amounts of from 0 to 0.5% by weight, based on the weight of the organosilicon compound,
   (C) swellable clay minerals and
   (D) hydraulic binder.

2. A composition as claimed in claim 1, further having,
   (E) concrete additives, and (F) fillers.

3. A composition as claimed in claim 2, wherein said composition is further diluted with water in amounts of from 10 to 50% by weight based on the total weight of the composition.

4. A composition as claimed in claim 2, wherein
(A) is present from 0.01 to 5% by weight,
(B) is present from 0.01 to 10% by weight,
(C) is present from 0.1 to 15% by weight,
(D) is present from 5.0 to 30.0% by weight,
(E) is present from 0.1 to 2.0% by weight, and
(F) is present from 45.0 to 85.0% by weight based on the total weight of the composition.

* * * * *